Aug. 24, 1954

T. R. SCOTHORN 2,687,499

ELECTRONIC CONTROL SYSTEM

Filed July 24, 1953

INVENTOR.
THOMAS R. SCOTHORN
BY
ATTORNEY.

Patented Aug. 24, 1954

2,687,499

UNITED STATES PATENT OFFICE 2,687,499

ELECTRONIC CONTROL SYSTEM

Thomas R. Scothorn, Detroit, Mich., assignor to Industrial Electronics, Inc., Detroit, Mich., a corporation of Michigan Application July 24, 1953, Serial No. 370,088

5 Claims. (Cl. 317—130)

1

This invention relates to an electronic control system for passing current in a circuit and more particularly to a novel and inventive control which embodies electrical and mechanical features in combination to effect a positive control over the circuit.

Although the control device here described and claimed may be used to a considerable extent for the control of power to a motor or solenoid for machinery, it is to be clearly understood that such end use is not a limiting feature of the invention. However, such use is a preferred embodiment of the invention and will be described below in relation to the control system.

Most of the electronic control devices for press equipment heretofore designed and in use have had a common defect. A photoelectric cell, like any other piece of equipment, is subject to failure for a variety of reasons. For instance, the electron tube may short out and pass current through a line to press equipment or the photoelectric cell may be sensitized and caused to react at times when it should not do so. Other possibilities are also present. For these reasons, the control of a power circuit to operate machinery must be made "fail-safe," i. e. the power circuit must be made inoperative upon failure of the device which is designed to control that circuit.

An extremely important industrial problem is that of making machinery safe for use by an operator. Injuries occur at great frequency, due, to a large extent, to a failure of accident prevention devices and mechanism to function as designed and required. Many of these devices are mechanical, some are electrical and include electronic components. The device of this invention embodies electronic equipment having certain mechanical features which coact to produce a fail-safe circuit control system.

The most common system employing a photoelectric unit provides for a switch to open and close a circuit to a machine drive or to a solenoid controlling a machine drive, and a photoelectric unit in series in the circuit passing a beam of light to a light sensitive cell which opens the circuit upon interruption of the beam. Variations of this simple system may include switches operated by series relays and additional solenoid coils. The principal defect of such systems, however, is that if the photoelectric unit should fail for some reason and pass current to the drive operating circuit, the machine will operate in spite of a beam interruption.

It is therefore an object of this invention to provide a fail-safe device to control the operation of machine equipment, which embodies an electronic unit therein.

A further object is to provide a control system that employs mechanical and electrical features in combination to produce a fail-safe control of a power circuit.

Another object is to provide a control system in which relays are so combined electrically and mechanically as to produce a fail-safe device.

Still another object is to key the light beam in a photoelectric unit to the control system so that the light beam will be created only upon closing a switch in the system to pass current to a machine drive.

A further object is to arrange two relays mechanically so that when one relay is energized electrically it will prevent the mechanical functioning of the second relay to perform in its usual manner.

Other features of the construction will become more apparent from the description given below. For a visual understanding of the invention, reference may be had to the accompanying drawing made an integral part hereof, and in which Fig. 1 is a fragmentary front elevational view of a press machine on which the inventive device has been installed.

Figure 1:
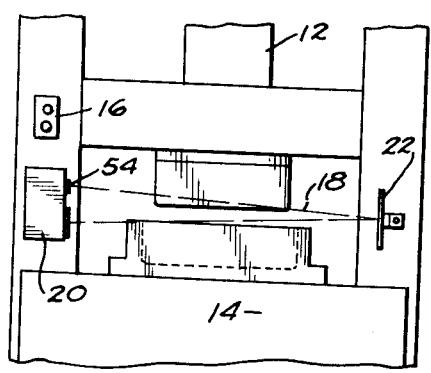

As shown in Fig. 1, a representative machine on which the inventive device is embodied is a press 10 having an upper movable ram 12 and a lower stationery bed 14. An operator (not shown) would normally work at the front of the press, operating it by means of switch 16. Across the front between the press and the operator, at die set height, is a light beam 18 normally generated upon closing switch 16. Beam 18 issues from a photoelectric unit, designated generally by the numeral 20, and passes to a reflector 22 which returns the beam to the unit 20. The beam 18 is designed to go on only when switch 16 is closed, remaining normally off at all other times.

Figure 4:
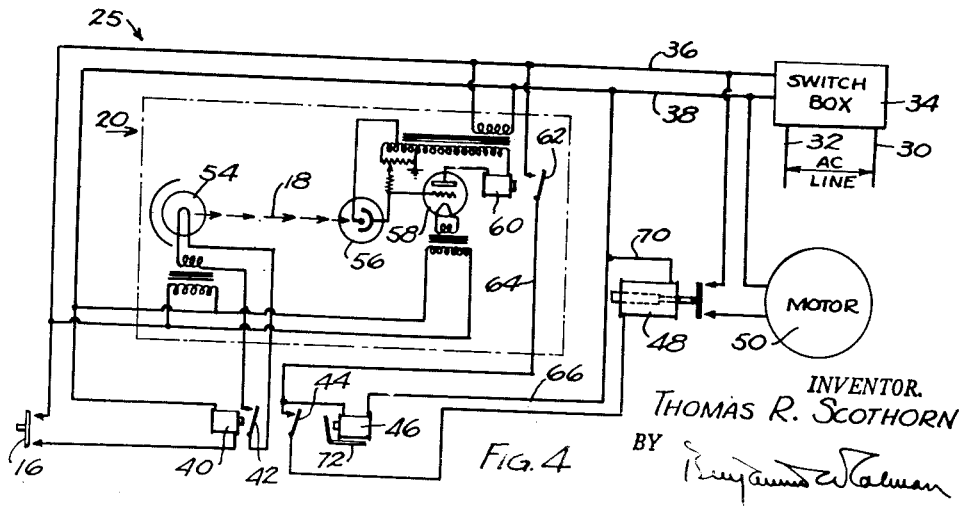
Fig. 4 is a wiring diagram for a control system employing a photoelectric unit.

To understand the electrical hookup of the control system 25, reference is made to Fig. 4, where it will be seen that a source of electrical power passes current along conductors 30, 32 to a switch box 34. From there conductors 36, 38 carry current to the control system 25, which comprises the photoelectric unit 20, the switch 16, a relay 40 having a double set of contacts 42, 42 and 44, 44, and a relay 46. The control system 25 is arranged to pass current through a solenoid coil 48 which closes a circuit from power lines 36, 38 to a motor drive 50.

Figure 2:
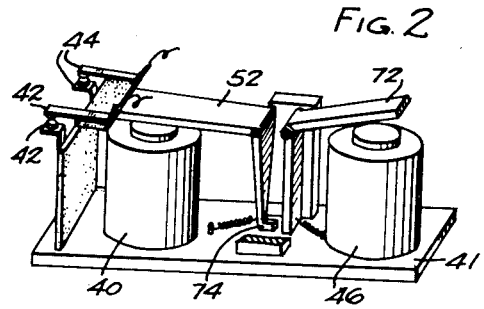
Fig. 2 is a perspective view of two relay units employed in the control system, showing the mechanical features which make the system fail-safe.

As shown in Fig. 2, relay 40 is arranged on a base 41 with a movable pivoted arm 52 that causes the upper contacts 42 and 44 to move downwardly into pressing contact with lower contacts 42 and 44, when the relay is energized by current passed to it upon closing switch 16. Closing contacts 42, 42 passes current to the lamp 54 which emits a beam of light that strikes, either directly or by reflection, the light sensitive photoelectric cell 56. The cell 56 is connected to the grid of an electron tube 58, causing an increase in the current flow to the plate of the tube, which energizes a relay 60. When relay 60 is energized it closes contacts 62, 62 passing current to the second set of contacts 44, 44 which energizes the solenoid coil 48, causing the power circuit to motor drive 50 to close.

Connected to conductor 64, which leads from contact 62 of relay 60 to contact 44 of relay 40 is relay 46, having its other power lead 66 connected with conductor 79 which supplies current to solenoid coil 48.

It will be seen from an examination of Fig. 4 that upon closing switch 16, relay 40 will be energized, closing contacts 42, 42 and 44, 44. This will cause lamp 54 to emit the light beam 18, activating photoelectric cell 56 to pass a current to relay 60, which then closes contacts 62, 62, completing the circuit to solenoid coil 48.

If lamp 54 should fail, there would be no effective light beam 18, and contacts 62, 62 would remain open, as relay 60 would not be energized. But, if the electron tube 58 should fail and become short circuited, then a current would pass to relay 60 closing contacts 62, 62. This would happen even though switch 16 were not closed. The machine drive would then be ready to go into operation regardless of the interruption of light beam 18, and the safety of the operator would be reduced to zero.

To make the control system 25 fail-safe, relay 46 is arranged on base 41 in back to back alignment with relay 40, so that the movable pivoted arm 72 of relay 46 will swing into pressing mechanical contact with arm 52 of relay 40. By adding a small block 74 to the bottom of arm 52, or turning up the end of arm 52, the distance between arms 52 and 72 is shortened. Thus, when relay 40 is energized, arm 52 will swing out, causing block 74 to bear against arm 72 of relay 46. Relay 46 may then be energized, but its arm 72 will not swing outward due to the greater resistance of relay arm 52 against such movement. Further, the magnetic pull of each relay coil being approximately equal, the closure of one contact arm precludes the closing of the other contact arm bearing against it because the magnetic attraction is inversely proportional to the square of the distance between the relay core and its contact arm.

If relay 46 should become energized by a failure in the photoelectric unit 20 before switch 16 is closed, then its arm 72 will swing outward and bear against block 74 on relay arm 52, preventing closure of contacts 42, 42 and 44, 44. This is the fail-safe feature of the control system 25.

Figure 3:
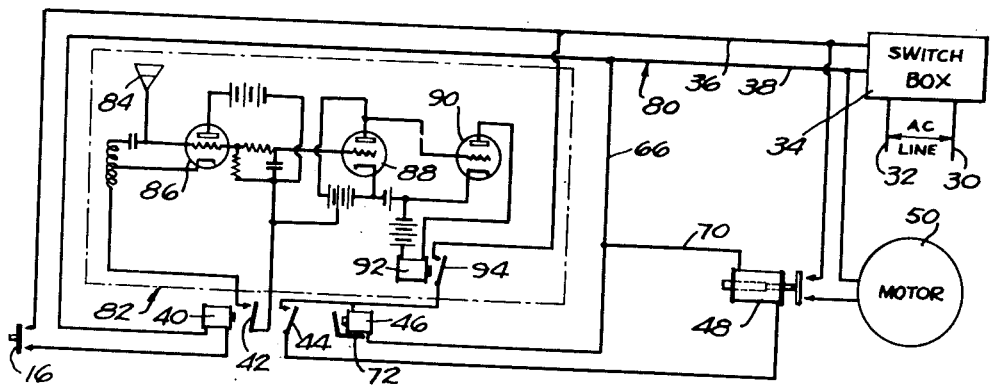
Fig. 3 is a wiring diagram for a control system employing a capacity-type device.

A variation of this control system is shown in Fig. 3, where a capacity type device is employed in place of the photoelectric unit 20 above described. The control system 80 of Fig. 3 consists of the capacity type device 82 arranged in a circuit similar to that of system 25 with the substitution of device 82 for the photoelectric unit 20.

In this system, an antenna 84 is arranged across the front of press 10, slightly below the die set opening and insulated from press 10. The antenna is connected to the oscillator electron tube 86, in turn connected to an amplifier tube 88. The cathodes of both tubes are shown with independent sources of energy, but they may be arranged to draw current from power leads 36, 38. The plate current of tube 88 causes a third electron tube 90 to energize relay 92, closing its contacts 94, 94. From this point on the two circuits of Figs. 3 and 4 are the same. By closing manual switch 16, oscillator tube 86 starts oscillating, the resulting voltage is amplified by tube 88 and applied to the grid of tube 90, causing relay 92 to close its contacts 94, 94, thus completing the circuit to solenoid coil 48 through relay contacts 44, 44 of relay 40.

If the operator or an object be present in the antenna-sensitive area, the output voltage of the oscillator tube 86 will be reduced to a point at which relay 92 will not operate to close its contacts 94, 94. Thus, the solenoid coil 48 will not be energized to close the circuit to motor drive 50. Or, if the capacity type device 82 should fail for some reason, such as a short circuit through any of the tubes 86, 88 or 90, whereby current is passed to relay 92, causing contacts 94, 94 to close, relay 46 will be energized and draw its pivoted contact arm 72 downwardly and against block 74 of contact arm 52. Thus, electrically applied mechanical leverage of arm 72 will prevent arm 52 of relay 40 from closing its contacts 42, 42 and 44, 44 until the cause of failure has been corrected. Further, the capacity type device 82 is keyed—as is the photoelectric unit 20 in control system 25—to the switch 16, so that it functions in cooperation with switch 16.

In operation, under ideal conditions, the operator will close switch 16 in system 25, causing lamp 54 to throw a light beam 18 to photoelectric cell 56, actuating electron tube 58 and causing relay 60 to close its contacts 62, 62. Power current is then passed to solenoid coil 48 which closes the circuit to motor drive 50. If the photoelectric unit 20 should become short circuited and pass current to relay 60 before switch 16 is closed, relay 46 will be energized and its arm 72 will pivot into movement-resistant contact against block 74 of arm 52 on relay 40, preventing any movement of arm 52, if and when switch 16 is closed thereafter.

The capacitance type oscillating unit 82 in control system 80 functions in a manner very similar to photoelectric unit 20, causing its relay 92 (Fig. 3) to act in a manner identical with that of relay 60 (Fig. 4).

Having described my invention in its simplest terms, it is to be understood that the details of the foregoing construction may be modified and varied in greater or lesser degree without departing from the essence of my invention.

I claim:

1. In an electronic control system, the combination of an electrically-actuated power device, an electrical circuit serving said device, a switch and switch operated relay means in said electrical circuit adapted to open and close a double set of electrical contacts arranged on said relay means, a photoelectric circuit served by one set of said contacts, said power device being served by the second set of said contacts, a second relay means in said photoelectric circuit adapted to close contacts in the circuit served by said second set of contacts upon electrical actuation of said photoelectric circuit by said switch, and a third relay means operative upon electrical actuation of said second relay means, said switch operated relay means and said third relay means being arranged in a mechanically coacting relationship, the magnetically controlled contact arms of both said last mentioned relay means being so disposed that upon energization of one of said last mentioned relay means its contact arm will come into movement-resistant contact with the other of said arms, preventing movement of said latter arm.

2. In an electronic control system, the combination of an electrically-operated means, an electrical circuit serving said means, a switch and switch operated relay means in said electrical circuit having a magnetically controlled contact arm adapted to open and close a double set of contacts arranged on said relay means in said electrical circuit, a photoelectric circuit served by one set of said contacts, said electrically operated means served by the second set of said contacts, a second relay means in said photoelectric circuit adapted to open and close the circuit portion served by said second set of contacts upon electrical actuation of said photoelectric circuit by said switch, and a third relay means in said electrical circuit, having a magnetically controlled contact arm, electrically operative upon electrical actuation of said second relay means, said switch operated relay means and said third relay means being arranged in back to back relationship, the magnetically controlled contact arms of both said last mentioned relay means being so disposed opposite each other that upon energization of one of said last mentioned relay means its contact arm will come into pressing contiguous movement-resistant contact with the other of said arms.

3. In an electronic control system, the combination of an electrically operated means, an electrical circuit serving said means, a switch and switch operated relay means in said electrical circuit having a magnetically controlled contact arm adapted to open and close a double set of contacts in said electrical circuit arranged on said relay means, a capacitance type device served by the circuit portion controlled by one set of said contacts, said electrically operated means served by the second set of said contacts, a second relay means in said capacitance type device adapted to open and close the circuit portion served by said second set of contacts upon electrical actuation of said capacitance type device by said switch, and a third relay means in said electrical circuit, having a magnetically controlled contact arm, electrically operative upon electrical actuation of said second relay means, said switch operated relay means and said third relay means being arranged in a mechanical coacting relationship, the magnetically controlled contact arms of both said last mentioned relay means being so arranged that upon energization of one of said last mentioned relay means its contact arm will come into movement-resistant contact with the other of said arms.

4. In an electronic control system, the combination of an electrically operated means, an electrical circuit serving said means, a switch and switch operated relay means in said electrical circuit having a magnetically controlled contact arm adapted to open and close a double set of contacts arranged on said relay means in said electrical circuit, a capacitance type oscillator device served by the circuit portion controlled by one set of said contacts, said electrically operated means served by the second set of said contacts, a second relay means in said capacitance type oscillator device adapted to open and close the circuit portion served by said second set of contacts upon electrical actuation of said capacitance type oscillator device by said switch, and a third relay means in said electrical circuit, having a magnetically controlled contact arm, electrically operative upon electrical actuation of said second relay means, said switch operated relay means and said third relay means being arranged in back to back relationship, the magnetically controlled contact arms of both said last mentioned relay means being so arranged that upon energization of one of said last mentioned relay means its contact arm is brought into movement-resistant contact with the other of said arms.

5. In an electronic control system, the combination of an electrically operated means, an electrical circuit serving said means, a switch and switch operated relay means in said electrical circuit having a magnetically controlled contact arm adapted to open and close a double set of contacts arranged on said relay means in said electrical circuit, an electron-responsive device served by the circuit portion controlled by one set of said contacts, said electrically operated means served by the second set of said contacts, a second relay means in said electron-responsive device adapted to open and close the circuit portion served by said second set of contacts upon electrical actuation of said electron-responsive device by said switch, and a third relay means, in said electrical circuit, having a magnetically controlled contact arm, electrically operative upon electrical actuation of said second relay means, said switch operated relay means and said third relay means being arranged in a mechanical relationship, the magnetically controlled contact arms of both said last mentioned relay means being so disposed that upon energization of one of said last mentioned relay means its arm is brought into movement-resistant contact with the other of said arms so that said latter arm is prevented from moving.

No references cited.